(12) United States Patent
Ishii

(10) Patent No.: US 9,916,647 B2
(45) Date of Patent: Mar. 13, 2018

(54) LIQUID CRYSTAL DISPLAY APPARATUS

(71) Applicant: CANON KABUSHIKI KAISHA, Tokyo (JP)

(72) Inventor: Atsushi Ishii, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/009,109

(22) Filed: Jan. 28, 2016

(65) Prior Publication Data

US 2016/0225329 A1 Aug. 4, 2016

(30) Foreign Application Priority Data

Jan. 30, 2015 (JP) ................................. 2015-016166

(51) Int. Cl.
*G09G 3/36* (2006.01)
*G06T 5/40* (2006.01)
*G06T 5/00* (2006.01)
*G09G 3/20* (2006.01)

(52) U.S. Cl.
CPC .............. *G06T 5/40* (2013.01); *G06T 5/009* (2013.01); *G09G 3/2011* (2013.01); *G09G 3/3648* (2013.01); *G09G 2320/0209* (2013.01); *G09G 2340/16* (2013.01)

(58) Field of Classification Search
CPC ....... G09G 2320/02; G09G 2320/0209; G09G 2320/04
USPC ....................................... 345/87–88
See application file for complete search history.

(56) References Cited

U.S. PATENT DOCUMENTS

| 6,727,872 | B2 | 4/2004 | Pfeiffer et al. | |
|---|---|---|---|---|
| 8,260,047 | B2 * | 9/2012 | Ouyang | G06K 9/38 345/213 |
| 8,823,617 | B2 | 9/2014 | Kurosawa | |
| 2012/0242717 | A1 * | 9/2012 | Kurosawa | G09G 3/001 345/690 |

FOREIGN PATENT DOCUMENTS

JP 2012203052 A 10/2012

* cited by examiner

*Primary Examiner* — Roy Rabindranath
(74) *Attorney, Agent, or Firm* — Rossi, Kimms & McDowell LLP

(57) ABSTRACT

A liquid crystal display apparatus, which displays an image on the basis of an input image signal input from an outside, includes a liquid crystal display element, a processor that performs a plurality of processing to reduce disclination in the liquid crystal element with respect to the input image signal selectively or in combination so as to acquire an output image signal, and a liquid crystal driver that drives the liquid crystal display element using the output image signal.

6 Claims, 4 Drawing Sheets

| 1 | 2 | 1 |
|---|---|---|
| 2 | 4 | 2 |
| 1 | 2 | 1 |

LIQUID CRYSTAL DISPLAY APPARATUS

BACKGROUND OF THE INVENTION

Field of the Invention

The present invention relates to a liquid crystal display apparatus.

Description of the Related Art

U.S. Pat. No. 6,727,872 discloses an image processing method for reducing potential differences corresponding gradation level (graduation value) differences between adjacent pixels so as to decrease liquid crystal orientation defective phenomenon referred to disclination.

Moreover, Japanese Patent Laid-Open No. ("JP") 2012-203052 discloses a liquid crystal display apparatus reducing both image quality deterioration, which dulls an edge of an image, and disclination.

Using the methods of U.S. Pat. No. 6,727,872 and JP 2012-203052 can control disclination.

However, the methods of U.S. Pat. No. 6,727,872, in which an edge of an input image signal dulls, is unsuitable for a video that includes characters and figures and is demanded for sharpness.

Meanwhile, the method of JP 2012-203052, in which brightness and a contrast ratio decreases, is unsuitable for a video that is demented for high brightness and high contrast ratio.

SUMMARY OF THE INVENTION

In view of the foregoing, the present invention provides a liquid crystal display apparatus capable of reducing disclination without deteriorating image quality with respect to various input image signals.

A liquid crystal display apparatus, which displays an image on the basis of an input image signal input from an outside, as one aspect of the present invention includes a liquid crystal display element, a processor that performs a plurality of processing to reduce disclination in the liquid crystal element with respect to the input image signal selectively or in combination so as to acquire an output image signal, and a liquid crystal driver that drives the liquid crystal display element using the output image signal.

Further features of the present invention will become apparent from the following description of exemplary embodiments (with reference to the attached drawings).

DESCRIPTION OF THE EMBODIMENTS

Figure 1:
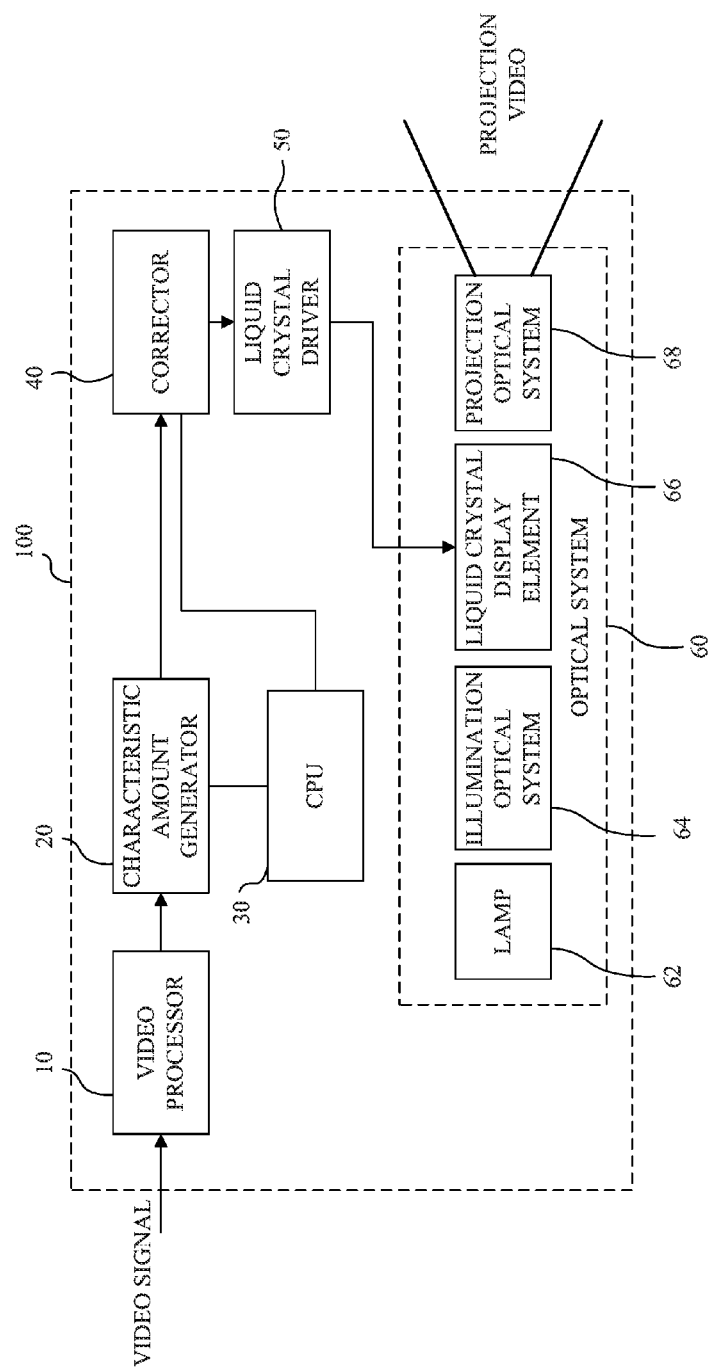
FIG. 1 is a block diagram illustrating a configuration of a projector according to Embodiment of the present invention.

A liquid crystal projector 100 according to an embodiment of the present invention, which displays an input image signal using a liquid crystal display element, will be explained referring to FIG. 1.

An video processor 10 is provides with terminals, such as a composite terminal and an HDMI terminal, to input a video signal and a receiver IC to receive the video signal input through the terminal. The video processor 10 generates a image signal performed image processing, such as a brightness correction, a contrast correction, a gamma conversion, a color conversion, a resolution conversion, sharpening processing, an IP conversion, a geometric conversion, and overdrive processing, to an input image signal.

A characteristic amount generator 20, which is connected to the video processor 10, quantifies information regarding prediction of a generating state of disclination in a screen of an image of the image signal output from the video processor 10 so as to generate characteristic amounts. The generated characteristic amounts, which are brightness histogram information expressing appearance frequency of a brightness value and frequency histogram information expressing frequency component distribution of a video signal, is expressed in one-dimensional array form according to a predetermined range in the embodiment. The brightness histogram information is generated by referring to pixel values of all pixels of the image and counting appearance frequency in a predetermined grading region based on a graduation value of each pixel. Additionally, the frequency histogram information is generated by measuring spatial frequency for every frame image and counting appearance frequency in a predetermined frequency region.

The CPU 30 is connected to the video processor 10, the characteristic amount generator 20, and a corrector 40. The CPU 30 is a microcomputer (processor) that reads out the characteristic amounts from the characteristic amount generator 20, sets the corrector 40 to correction amounts (correction parameter) according to the characteristic amounts, and controls a power and a state each part of the liquid crystal projector 100. Furthermore, the CPU 30 can select video processing performed by the video processor 10 and correction processing of the corrector 40, can control an on/off state and an effect of each video processing and correction processing, and can acquire the state.

The corrector 40 is connected to the video processor 10 and the CPU 30. The corrector 40 corrects the image signal so as to reduce disclination. The corrector 40 can perform a plurality of corrections. The liquid crystal driver 50, which is connected to the corrector 40, converts the image signal corrected by the corrector 40 to a liquid crystal driving signal and drives a liquid crystal display element 66 of an optical system 60.

The optical system 60 includes a lamp 62, an illumination optical system 64, the liquid crystal display element 66, and a projection optical system 68. A light output from the lamp 62 passes the illumination optical system 64 and is projected onto a screen as a projection image through the projection optical system (projection lens) 68 after being modulated by the liquid crystal display element 66. The liquid crystal display element 66, which is connected to the liquid crystal driver 50, modulates an incident luminous flux on the basis of the liquid crystal driving signal output from the liquid crystal driver 50.

The CPU 30 sets common correction amounts of disclination, which is acquired based on calculation described later, with respect to the entire screen to the corrector 40.

Example 1

Figure 2:
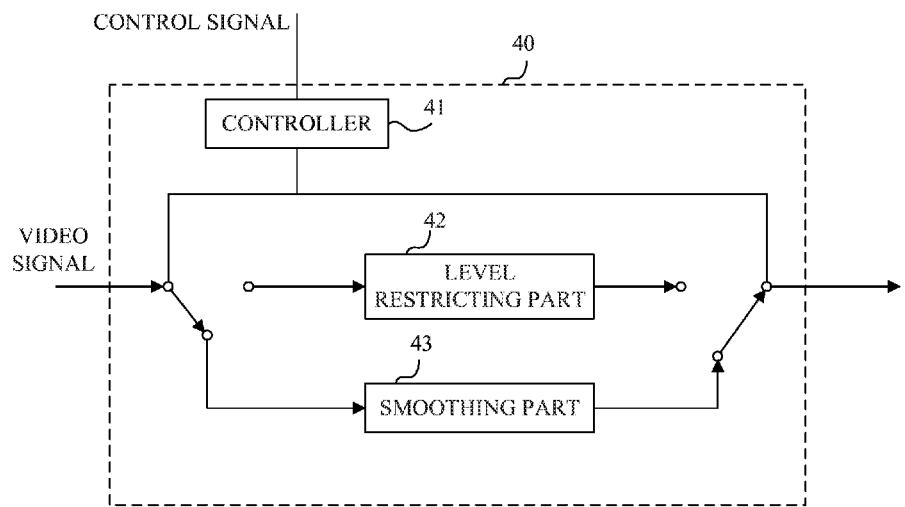
FIG. 2 is a block diagram illustrating details of a corrector 40 according to Example 1 of the present invention.

FIG. 2 is a block diagram illustrating details of the corrector 40 according to this example. The corrector 40 includes a controller 41, a level restricting part 42, and a smoothing part 43, and the controller 41 controls a path of a video signal based on the control signal sent from the CPU 30. On the basis of the control of the path of the video signal, correcting process to the video signal using the level restricting part 42 or the smoothing part 43 is determined.

Figures 4, 5:
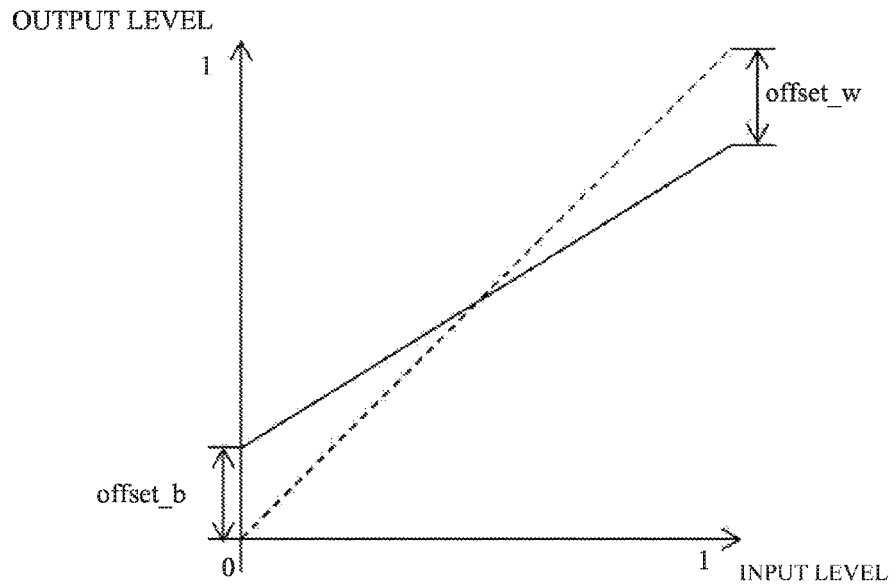
FIG. 4 is a schematic diagram illustrating correction characteristics of a graduation value of correction processing performed by a level restricting part 42.
FIG. 5 is a schematic diagram illustrating a smoothing filter of correction processing performed by a smoothing part 43.

The level restricting part 42 is a circuit having input output characteristics as illustrated in FIG. 4. Offset amount offset_b on a black side and offset amount offset_w on a white side are independently settable from an outside, and the corrector 40 decreases a dynamic range of the driving voltage of the liquid crystal display element 66. In FIG. 4, an abscissa axis represents graduation values of an input image, and an ordinate axis represents graduation values of an output image. The offset amount offset_b and offset amount offset_w are equivalent to correction amounts. For example, decreasing (downsizing) the dynamic range includes at least one of decreasing a minimum value of driving voltage values to drive the liquid crystal and increasing a maximum value thereof. In other words, downsizing the dynamic range of the driving voltage may be downsizing the dynamic range of the graduation values of the input image signal. In this example, the offset amount offset_b and offset amount offset_w are determined according to the correction amounts set by the CPU 30. Thus, larger correction amounts restrict the dynamic range of the image signal and control disclination.

Meanwhile, the smoothing part 43 is a circuit performing smoothing based on a two-dimensional filter as illustrated in FIG. 5. The video signal input to the smoothing part 43 is corrected by adding the pixel through the filter of FIG. 5 to the input pixel using weighted addition according to the correction amounts set from the CPU 30. Larger correction amounts place an emphasis on the smoothed video signal side. Thus, larger correction amounts smooth the video signal and controls disclination as the level restricting part 42.

Figure 3:
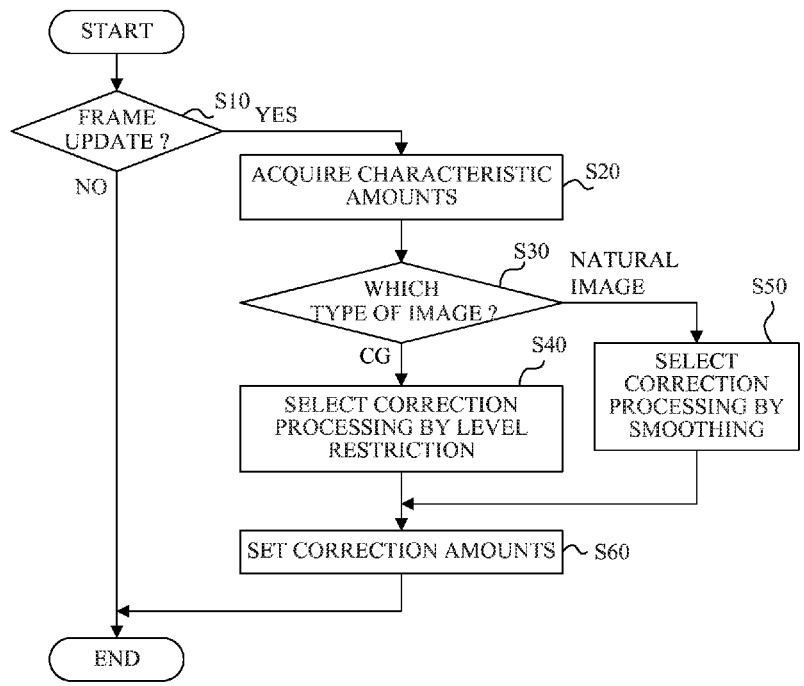
FIG. 3 is a flowchart according to Example 1 of the present invention.

FIG. 3 is a flowchart to explain an operation of disclination correction of the corrector 40 controlled by the CPU 30 according to this example. This processing is executed according to a computer program (control program) by the CPU 30. This processing is embodied as an executable program. The flow of FIG. 3 starts every constant time (for example, 1 millisecond).

When the processing starts, at step S10, the CPU 30 determines whether or not a V synchronization signal of the video signal, which is input to the projector and is currently displayed, is input. If the V synchronization signal is input, the flow proceeds to step S20. Otherwise, this flow ends.

At step S20, the CPU30 acquires the brightness histogram information expressing appearance frequency of a brightness value and the frequency histogram information from the characteristic amount generator 20.

At step S30, the CPU 30 determines that the video signal is a CG (computer-generated animation) or a natural image on the basis of the frequency histogram acquired from the characteristic amount generator 20. The determination is performed whether or not component amounts of a frequency band set in advance exceeds a threshold value. If the CPU 30 determines that the video signal is the CG, the flow proceeds to step S40. Otherwise, the flow proceeds to step S50.

At step S40, the CPU 30 transmits a control signal of the path control to the controller 41 so as to perform the correction processing by the level restricting part 42 as the correcting processing by the corrector 40. As step S50, the CPU 30 transmits a control signal of the path control to the controller 41 so as to perform the correction processing of the smoothing part 43 as the correcting processing by the corrector 40.

At step S60, the CPU 30 acquires correction amounts with respect to the corrector 40 on the basis of the brightness histogram information as characteristic amounts to set. The level restricting part 42 and the smoothing part 43 are respectively set the correction amounts. After completing the setting of the correction amounts with respect to the corrector 40, the flow ends.

$$param = \sum_{i=n}^{M} 1Hist_i \times \sum_{j=k}^{1} 1Hist_j \div C \qquad (1)$$

In the conditional expression (1), lHist represents brightness histogram, param represents the correction amounts set to the corrector 40, and n, m, k, l, and C are constant numbers set in advance. The constants n, m, k, and l correspond to the graduation value and satisfy relationship n<m<k<l. The constants n and m represent a range of graduation determined a dark part, and the constants k and l represent a range of graduation determined a bright part. According to the conditional expression (1), in the image including many dark and bright parts, in other words, the image easy to generate disclination, the correction amounts param become larger. Meanwhile, in the image including few one or both of dark and bright parts, in other words, the image difficult to generate disclination, the correction amounts param become smaller. Since the correction amounts param according to this example are used in both of the level restricting part 42 and the smoothing part 43, both correction amounts with respect to both correction methods are determined using the correction amounts param acquired the above calculation.

Since the corrector 40 conventionally performs a correction using a single correction method, a preferable correction fails to be performed depending on the input image signal.

Meanwhile, in this example, since correction method of disclination is selected according to a type of a video signal, a preferable correction is always performable regardless of an input image signal. For example, the correction by a level restriction is performed with respect to an input image signal used for a screen of a word processer and a spreadsheet in which sharpness have a potent influence, and the correction by smoothing is performed with respect to an input image used for a picture in which brightness and atmosphere are important.

Example 2

The apparatus configuration according to Example 2 is the same apparatus configuration as Example 1 except for the detail configuration of a corrector 40 and a control processing of a CPU 30 with respect to the corrector 40.

Figure 6:
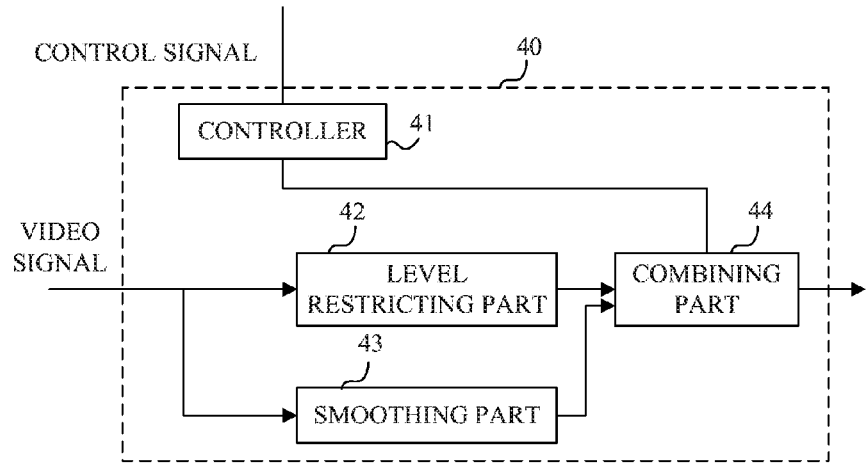
FIG. 6 is a block diagram illustrating details of a corrector 40 according to Example 2 of the present invention.

FIG. 6 is a block diagram illustrating details of the corrector 40 according to this example. The corrector 40 includes a controller 41, a level restricting part 42, a smoothing part 43, and a combining part 44. The level restricting part 42 and the smoothing part 43 are the same circuits as Example 1. In the corrector 40 according to this example, a video signal is send to both of the level restricting part 42 and the smoothing part 43, and they respectively performs correction processing. The combining part 44, which is controlled by the controller 41, generates a video signal combined video signals output from the level restricting part 42 and the smoothing part 43 using weighting and outputs it. The controller 41 sets weighting coefficients, which the combining part 44 uses, based on the control signal sent from the CPU 30

Figure 7:
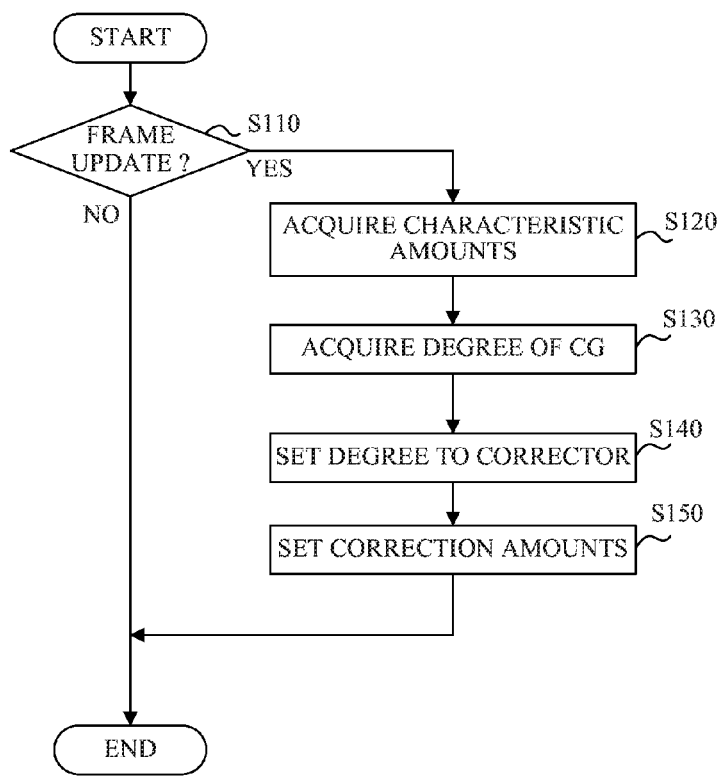
FIG. 7 is a flowchart according to Example 2 of the present invention.

FIG. 7 is a flowchart to explain the operation of disclination correction of the corrector 40 controlled by the CPU 30 according to this example. This processing is executed according to a computer program (control program) by the CPU 30. This processing is embodied as an executable program. The flow of FIG. 7 starts every constant time (for example, 1 millisecond).

Since the processing at steps S110 and S120 is the same as the processing at the steps S10 and S20 according to Example 1, their explanations are omitted.

At step S130, the CPU 30 determines a degree of a high frequency image of the video signal on the basis of the frequency histogram acquired from the characteristic generator 20. The determination result is acquired on the basis of component amounts of a frequency band advance. When high frequency component amounts are higher than a predetermined value, the CPU 30 determines that the video signal is the CG, and the degree is a value so that the combining part 44 weights the video signal output from the level restricting part 42. Meanwhile, when high frequency component amounts are lower than the predetermined value, the CPU 30 determines that the video signal is the natural image, and the degree is a value so that the combining part 44 weights the video signal output from the smoothing part 43.

At step S140, the CPU 30 sets the degree acquired at the step S130 to the combining part 44.

At step S150, the same processing as the step S60 according to Example 1 is performed, and the flow ends after completing the setting of the correction amounts with respect to the corrector 40.

In this example, since the correction method of disclination is gradually changed according to a type of a video signal, the liquid crystal display apparatus according to this example provides the same effect as Example 1. Further, when different type images are displayed at the same time, an intermediate correction method is selected, and thus, the preferable correction is performable. For example, when a picture is displayed in addition to a screen of a word processer and a spreadsheet, correction processing intermediate between the correction by the level restricting and the correction by smoothing is performable.

In the embodiment, the correction processing performed by the corrector 40 using two correction processing by the level restricting part 42 and the smoothing part 43 is explained. However, the correction processing performed by the corrector 40 may be performed using more than two correction processing.

Moreover, in this embodiment, the characteristic amount generator 20 generates the characteristic amounts using the brightness histogram and the frequency histogram of the entire image. However, the characteristic amount generator 20 may generate the characteristic amounts using the other in a different way, and may acquire the characteristic amounts in each region of the image.

Additionally, in the embodiment, the CPU acquires the correction amounts with respect to the corrector 40 on the basis of the brightness histogram information as the characteristic amounts. However, the CPU 30 may uses characteristic amounts other than the brightness histogram information to acquire the correction amounts with respect to the corrector 40. Furthermore, when the correction amounts are less than a predetermined value, the correction processing may be prevented from performing.

Moreover, in the embodiment, the CPU 30 changes the setting for the correction processing according to a start of the flow that starts every constant time. However, the CPU 30 may change the setting for the correction processing at a different timing. For example, the CPU 30 may change the setting for the correction processing at a timing where the V synchronization signal is input to the video processor 10.

Additionally, in the embodiment, the CPU 30 performs determination of the CG or the natural image and the degree of the CG using the frequency histogram.

However, the CPU 30 may determines them using a pattern matching, adaptive control, or movement information.

Furthermore, a determination type may be things, such as a portrait, a landscape photograph, a presentation screen, an animation reproduction screen, and a class expression of a continuous value, other than the CG and the natural image.

Besides, the present invention is achieved by performing the following processing. In other words, the processing is supplying a software (program) to realize a function of the embodiment to a system or a apparatus through a network or various storage medium and reading out the program by a computer (or a CPU or a MPU) of the system or the apparatus to execute it.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-016166, filed Jan. 30, 2015, which is hereby incorporated by reference herein in its entirety.

What is claimed is:

1. A liquid crystal display apparatus that displays an image based on an input image signal, the liquid crystal display apparatus comprising:
   a liquid crystal display element;
   a processor that performs processing to reduce disclination in the liquid crystal element with respect to the input image signal so as to output an output image signal; and
   a liquid crystal driver that drives the liquid crystal display element according to the output image signal,
   wherein the processor outputs the output image signal by performing processing that restricts an upper limit value, a lower limit value, or both an upper limit value and a lower limit value of a signal level of the input image signal in a case where amounts of a predetermined frequency component included in the input image signal are equal to or larger than a threshold value, and outputs the outputs image signal by performing processing that performs smoothing processing with respect to the input image signal in a case where the amounts of the predetermined frequency component included in the input image signal are smaller than the threshold value.

2. The liquid crystal display apparatus according to claim 1, wherein the processer generates frequency histogram information expressing frequency component distribution of the input image signal, and determines whether or not the amounts of the predetermined frequency component included in the input image signal are equal to or larger than the threshold value based on the frequency histogram information.

3. A liquid crystal display apparatus that displays an image based on an input image signal, the liquid crystal display apparatus comprising:
   a liquid crystal display element;
   a processor that performs processing to reduce disclination in the liquid crystal element with respect to the input image signal so as to output an output image signal; and
   a liquid crystal driver that drives the liquid crystal display element according to the output image signal,
   wherein the processer generates frequency histogram information expressing frequency component distribution of the input image signal, and determines a degree expressing a high frequency image degree of the input image signal according to a frequency component included in the input image signal based on the frequency histogram information,
   wherein the processing includes first correction processing that restricts an upper limit value, a lower limit value, or both the upper limit value and the lower limit value of a signal level of the input image signal and includes second correction processing that performs smoothing processing with respect to the input image signal, and
   wherein the processor combines the input image signal corrected by the first correction processing and the input image signal corrected by the second correction processing according to weighting based on the degree expressing the high frequency image so as to output the output image signal.

4. The liquid crystal display apparatus according to claim 3, wherein a higher degree expressing the high frequency image increases weighting of a correction of the input image signal by the first correction processing.

5. A display method that displays an image based on an input image signal, the method comprising the steps of:
   determining whether or not amounts of a predetermined frequency component included in the input image signal are equal to or larger than a threshold value;
   performing processing to reduce disclination in a liquid crystal element with respect to the input image signal so as to output an output image signal; and
   driving the liquid crystal display element according to the output image signal,
   wherein, in the step of performing the processing, the output signal is outputted by performing processing that restricts an upper limit value, a lower limit value, or both the upper limit value and the lower limit value of a signal level of the input image signal in a case where the amounts of the predetermined frequency component are equal to or lamer than the threshold value, and is outputted by performing processing that performs smoothing processing with respect to the input image signal in a case where the amounts of the predetermined frequency component are smaller than the threshold value.

6. A non-transitory computer-readable medium storing computer-executable instructions configured to cause execution of a display method that displays an image based on an input image signal, the method comprising the steps of:
   determining whether or not amounts of a predetermined frequency component included in the input image signal are equal to or larger than a threshold value;
   performing processing to reduce disclination in a liquid crystal element with respect to the input image signal so as to output an output image signal; and
   driving the liquid crystal display element according to the output image signal,
   wherein, in the step of performing the processing, the output signal is outputted by performing processing that restricts an upper limit value, a lower limit value, or both the upper limit value and the lower limit value of a signal level of the input image signal in a case where the amounts of the predetermined frequency component are equal to or lamer than the threshold value, and is outputted by performing processing that performs smoothing processing with respect to the input image signal in a case where the amounts of the predetermined frequency component are smaller than the threshold value.

* * * * *